United States Patent [19]

Sakurai

[11] 4,406,214

[45] Sep. 27, 1983

[54] BYPASS PASSAGEWAY CONSTRUCTION FOR A VEHICLE AIR CONDITIONER SYSTEM

[75] Inventor: Yukio Sakurai, Yokohama, Japan

[73] Assignee: Nissan Motor Co., Ltd., Yokohama, Japan

[21] Appl. No.: 203,848

[22] Filed: Nov. 4, 1980

[30] Foreign Application Priority Data

Nov. 6, 1979 [JP]  Japan ........................... 54-154356[U]

[51] Int. Cl.³ .............................................. B60H 1/24
[52] U.S. Cl. ...................................... 98/2.08; 98/2.06;
                                                137/875; 237/12.3 A
[58] Field of Search .................. 98/2, 2.05, 2.06, 2.08;
                                    237/12.3 A; 62/186, 187; 137/875

[56] References Cited

U.S. PATENT DOCUMENTS

| 1,906,704 | 5/1933 | McCoy . | |
|---|---|---|---|
| 2,196,330 | 4/1940 | Chandler | 137/875 X |
| 3,270,775 | 9/1966 | Alderson | 137/875 X |
| 3,646,875 | 3/1972 | Zenkner | 98/2.08 |
| 3,749,308 | 7/1973 | Fernandes et al. | 137/875 X |

FOREIGN PATENT DOCUMENTS

| 2159742 | 6/1973 | Fed. Rep. of Germany | 98/2.08 |
|---|---|---|---|
| 2208377 | 9/1973 | Fed. Rep. of Germany | 98/2.06 |
| 2648663 | 5/1978 | Fed. Rep. of Germany | 98/2.08 |
| 1294630 | 6/1962 | France . | |
| 1573588 | 7/1964 | France . | |
| 2349468 | 11/1977 | France . | |
| 2504475 | 3/1976 | German Democratic Rep. . | |
| 55-99408 | 7/1980 | Japan | 98/2.05 |
| 696712 | 9/1953 | United Kingdom . | |
| 730421 | 5/1955 | United Kingdom . | |
| 974366 | 11/1964 | United Kingdom . | |
| 1028074 | 5/1966 | United Kingdom . | |
| 1091625 | 11/1967 | United Kingdom . | |
| 1582336 | 1/1981 | United Kingdom . | |

Primary Examiner—Albert J. Makay
Assistant Examiner—Harold Joyce
Attorney, Agent, or Firm—Thompson, Birch, Gauthier & Samuels

[57] ABSTRACT

A ventilator air outlet door having a curved portion, a downstream deflecting portion, and support portions is pivotally disposed within the bypass passageway formed within an air distribution housing and is pivotally swung between a first position closing a ventilator outlet when the defrosting or heating mode is selected, and a second position within the bypass passageway, opening the ventilator outlet when the ventilating mode is selected thereby the ventilator door guiding the air flowing through the bypass passageway desirable direction when the ventilating defrosting or heating mode is selected.

2 Claims, 3 Drawing Figures

BYPASS PASSAGEWAY CONSTRUCTION FOR A VEHICLE AIR CONDITIONER SYSTEM

BACKGROUND OF THE INVENTION

1. Field of the Invention

The present invention relates generally to a bypass passageway construction for a vehicle air conditioner (i.e. distribution) system, and more specifically to a bypass passageway construction having a curved bypass passageway for bypassing a heater core and the like and having a plurality of outlets disposed downstream thereof.

2. Description of the Prior Art

In the case of a vehicle air distribution system, a bypass passageway, through which the air bypassing a heater core flows, is provided within an air distribution housing. Such a bypass passageway is formed into a curved configuration for bypassing a heater core and is provided with a plurality of outlets leading into respective air discharging ducts, such as a heater duct or a ventilator duct.

Therefore, it is important to lead the air flowing therethrough smoothly around the curved passageway for improving the efficiency of the air distribution system.

In prior art bypass passageway constructions, a plurality of vanes are provided within the curved bypass passageway for guiding the air flowing therethrough. However, such vanes resulted in increasing the frictional resistance of the airflow and in lowering the efficiency of the air distribution system. Furthermore, such a provision of vanes caused an additional drawback in that the number of construction parts of the air distribution system increased.

SUMMARY OF THE INVENTION

The improved bypass passageway construction for a vehicle air distribution system of the present invention comprises a ventilator door disposed within a bypass passageway formed within an air distribution housing. The ventilator door comprises a curved portion defining an arc substantially concentric about a pivot axis of the ventilator door, a pair of support members for connecting the curved portion, and at least one pivot shaft of the ventilator door, wherein the curved portion of the ventilator door is rotated about the pivot axis between a first position to close an outlet provided downstream of the bypass passageway and a second position within the bypass passageway to direct the flow of the air through the bypass passageway.

BRIEF DESCRIPTION OF THE DRAWINGS

The features and advantages of the bypass passageway construction of the present invention will be more clearly appreciated from the following description taken in conjunction with the accompanying drawings in which like reference numerals designate corresponding elements, and in which.

DESCRIPTION OF THE PREFERRED EMBODIMENT

Figure 1:
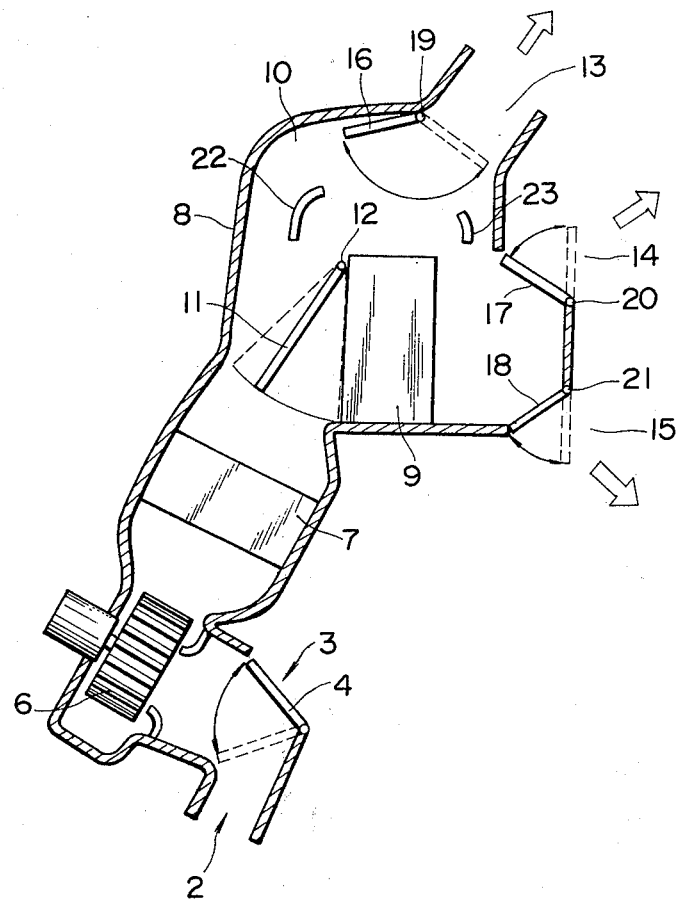
FIG. 1 is a cross sectional view of a prior art bypass passageway construction.

Before entering into the description of the embodiment, reference is first made to FIG. 1 indicating an example of a prior art bypass passageway construction.

As shown, an air distribution housing 8 is provided with two air induction ports 2 and 3, respectively, for recirculation air and for introducing outside air, and three outlets 13, 14 and 15, respectively, for the ventilator duct, a defroster nozzle, and a heater duct. A blower motor 6, an evaporator 7 and a heater core 9 are disposed with the air distribution housing 8. Each of the inlets and outlets is provided with respective doors 4, 16, 17 and 18. A bypass passageway 10 is formed within the air distribution housing 8 at the side of the heater core 9 and an air mix door 11 is provided for controlling the amounts of air flowing into the heater core 9 and into the bypass passageway 10. A pair of vanes 22 and 23 are provided within the bypass passageway 10 for directing the air flowing therethrough.

As aforementioned, the vanes 22 and 23 within the bypass passageway 10 increase the frictional resistance and increase the number of construction parts of the air distribution system.

Figure 2:
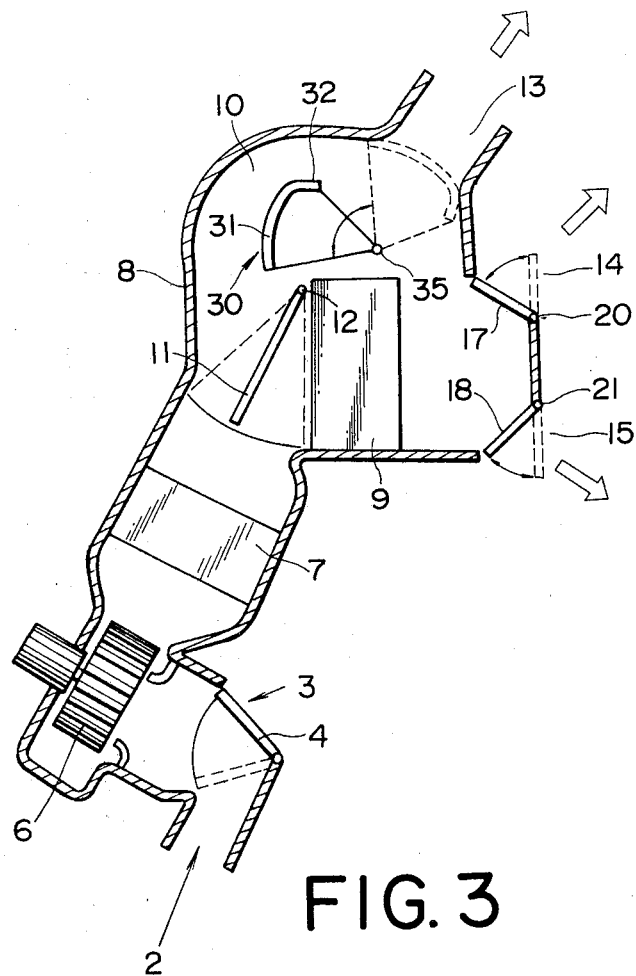
FIG. 2 is a cross sectional view of an embodiment of the bypass passageway construction of the air distribution system of the present invention.

Referring to FIG. 2, an embodiment of the present invention will now be described. As shown, the general construction of the air distribution system of this embodiment is the same as the prior art air distribution system shown in FIG. 1. The air distribution housing 8 is provided with air inlet ports 2 and 3 at one end thereof. An air intake door 4 is provided for channeling the air flow from a recirculation air induction port 2 or from an outside air induction port 3. A blower motor 6 is provided on the downstream side of the air intake door 4, and an evaporator 7 is disposed on the downstream side of the blower motor 6. A heater core 9 is disposed on the downstream side of the evaporator 7 within the air distribution housing 8. A cold air bypass passageway 10 is formed within the air distribution housing 8 at the side of the heater core 9.

An air mix door 11 is pivotally connected to a pivot shaft 12 at an inlet portion of the heater core 9, and is controllably pivoted, selected positions to channel all or varying amounts of the flow of the air into the heater core and/or into the bypass passageway 10 bypassing the heater core 9.

The air distribution housing 8 is provided with three outlets 13, 14, and 15 respectively for ventilator duct, for defroster nozzle, and for heater duct. The defroster outlet 14 and the heater outlet 15 are provided with respective flat shaped doors, namely, defroster door 17, and heater door 18, supported by respective pivot shafts 20 and 21. The ventilator outlet 13 is provided with a ventilator door 30 supported by a pivot shaft 35 located in the bypass passageway 10. This ventilator door 30 is used as a vane for leading the air passing into the ventilating outlet 13 when the ventilator mode is selected, and is also used to close the ventilator outlet 13 when the defrosting or the heating mode is selected.

Figure 3:
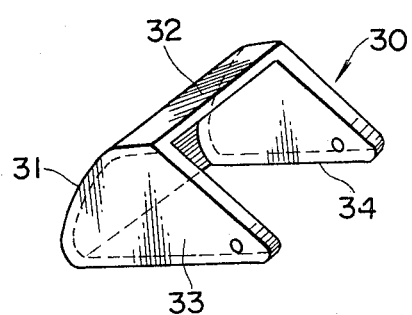
FIG. 3 is a perspective view of the ventilator door.

As shown in FIG. 3, the ventilator door 30 comprises an arc shaped curved portion 31 and an inwardly bent downstream deflecting portion 32. Both side edges of the ventilator door 30 are respectively connected to a pair of sectoral support members 33, 34 pivotally connected by a pivot shaft 35 to the air distribution housing 8. In this case, the vanes 22 and 23 used in the prior art air distribution system are not provided within the bypass passageway 10.

The operation of the above system will now be explained.

When the ventilating mode is selected, the ventilator door 30 is rotated in the counterclockwise direction, as shown by the solid line in FIG. 2, to open the ventilator outlet 13. The curved deflecting portion 31 and bent portion 32 thereof are then located within the bypass passageway, thereby guiding the air flowing therethrough and deflecting and mixing the cold air within the passageway 10 with the hot air from the heater core 9 wherein the relative amounts of cold air and hot air passing out through ventilator duct 13 are controlled by the air mix door 11.

When the defrosting mode or heating mode is selected, the defroster door 17 or the heater door 18 is opened, and the ventilator door 30 is closed, as shown by the broken line in FIG. 2. In this defrosting or heating mode, the frictional resistance of the air flowing through the bypass passageway 10 is reduced as compared with the prior art system since the inner space of the bypass passageway 10 has no objectionable member therein which will increase the frictional resistance of the air flowing therethrough. In addition, the bent deflecting portion 32 of the ventilator door 30 projects into the passageway 10 to mix the cold air flowing through the bypass passageway with the hot air from the heater core 9 wherein the relative amounts of cold air and hot air are controlled by the air mix door 11.

It will be readily appreciated from the foregoing, according to the present invention, that since a ventilator door is also used as a vane for guiding the air flow, the number of the construction parts can be reduced, and the frictional resistance of the passageway is reduced, especially during the defrosting mode or the heating mode, in which the vanes are not needed, thereby improving the efficiency of the air distribution system.

What is claimed is:

1. An air mixing apparatus for air distribution comprising:

an air distribution housing (8) having an air inlet, at least one heater/defroster air outlet (14 or 15) and a ventilation air outlet (13), the interior of said housing being formed into a hot air passage leading from said air inlet to said heater/defroster air outlet, a curved cold air passage (10) leading from said air inlet to said ventilation air outlet, and a rejoining air passage connecting a downstream end portion of said hot air passage and a downstream end portion of said cold air passage, heating means (9) disposed in said hot air passage for heating air flowing therethrough, an air mixing door (11) disposed in said housing (8), said air mixing door pivoting from one extreme door position in which all air from said air inlet is directed into said hot air passage, to the other extreme door position in which all air from said air inlet is directed into said cold air passage, to intermediate door positions in which air from said air inlet is directed into both said cold air and said hot air passages in varying proportions, at least one heater/defroster air outlet door (17 or 18) for opening and closing said at last one heater/defroster air outlet, a ventilation air outlet door (30) for opening and closing said ventilation air outlet, said ventilation air outlet door including a curved portion (31) having a curved cross-sectional shape when viewed along an axis parallel to the pivot axis of said door (30), said curved portion being convex on one side and being concave on the other side, said ventilation air outlet door also including a downstream deflecting portion (32), said ventilation air outlet door pivoting about an axis from an open position in which said door (30) is spaced from and opens said ventilation air outlet (13) and a closed position in which said door (30) closes said ventilation air outlet with its convex side, said ventilation air outlet door, when in its open position, causing the cold air within said cold air passage (10) to flow on both said concave and convex sides of said door (30), said deflecting portion (32) causing the cold air flowing on said concave side of said door (30) to be deflected towards said rejoining air passage, said ventilation air outlet door, when in its closed position, causing the cold air within said cold air passage (10) to flow only on the concave side of said door (30), said deflecting portion (32) causing the cold air flowing on said concave side of said door (30) to be deflected towards said rejoining air passage, and control means for adjusting the positions of said air mixing door (11), said heater/defroster air outlet door (17 or 18), and said ventilation air outlet door (30).

2. The air mixing apparatus of claim 1 wherein said downstream deflecting portion (32) extends into the pivot axis side of the radius of curvature of said curved portion (31).

* * * * *